Jan. 29, 1974   G. S. GADELIUS   3,788,916
METHOD AND APPARATUS FOR MANUFACTURING REINFORCED
PLASTIC CYLINDERS
Original Filed March 2, 1970
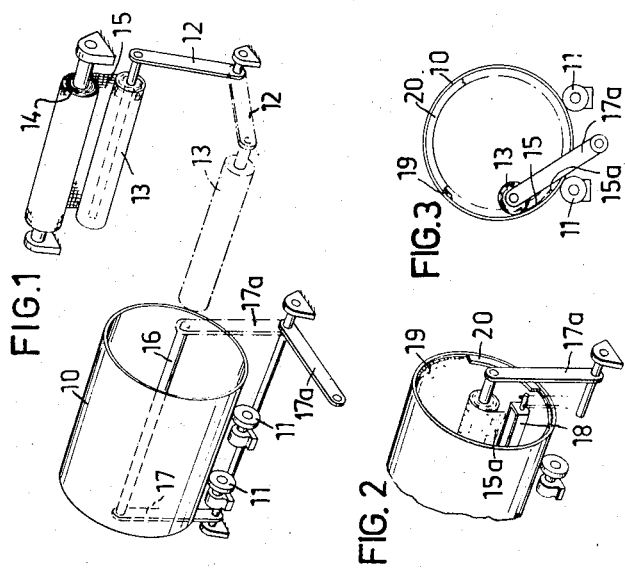
INVENTOR.
Gustaf Shiro Gadelius
BY
Pierce, Scheffler & Parker
Attorneys United States Patent Office 3,788,916
Patented Jan. 29, 1974

3,788,916
METHOD AND APPARATUS FOR MANUFACTURING REINFORCED PLASTIC CYLINDERS
Gustaf Shiro Gadelius, Lidingo, Sweden, assignor to Gadelius Inter S.A., Geneva, Switzerland
Original application Mar. 2, 1970, Ser. No. 15,783, now abandoned. Divided and this application Jan. 3, 1972, Ser. No. 215,224
Claims priority, application Sweden, Mar. 3, 1969, 2,887/69; Mar. 17, 1969, 3,642/69; Nov. 14, 1969, 15,665/69
Int. Cl. B32b 31/20; B29d 23/00
U.S. Cl. 156—74
2 Claims

ABSTRACT OF THE DISCLOSURE

A method of manufacturing glass-fibre reinforced plastic cylinders comprising the steps of applying a liquid plastic composition to the inside of a rotary moulding cylinder to disperse the plastic evenly over the interior surface of the cylinder by the action of centrifugal force, and introducing reinforcing material into the cylinder to form a uniform layer on the plastic layer, the reinforcing material being pressed into the plastic layer by centrifugal force and by means of a roller.

---

This is a division, of application Se. No. 15,783 filed Mar. 2, 1970, now abandoned.

The present invention relates to the manufacture of reinforced plastic cylinders, particularly cylinders of large diameter, in the region of one meter or more.

It is known to use a rotary moulding cylinder in which the reinforcing material is arranged and distributed as evenly as possible along the inner surface of the cylinder. Subsequent to arranging the reinforcing material a plastic composition is then poured onto the bottom of the cylinder and dispersed over the reinforcing material. Under the influence of centrifugal force, the plastic composition penetrates down between the fibres and strands of the reinforcing material but does not always fill all the cavities between the reinforcing strands, thereby causing air bubbles to remain, which, in some instances, cause the strength of the plastic cylinder to be uneven. The greatest disadvantage, however, is that air between the strands of the reinforcing material greatly retards the penetrating effect of the plastic composition, thereby extending the rate of manufacture by a corresponding degree.

Against the background of known methods of manufacture, one object of the present invention is to enable reinforced plastic cylinders to be produced more rapidly while using relatively simple and inexpensive devices and obtaining the desired uniform mechanical strength.

This object is realized by means of the method of the present invention, which is mainly characterized in that firstly a plastic composition is placed within a rotating mouldng cylinder and dispersed evenly over the inside surface thereof by the action of centrifugal force, and that secondly reinforcing material is introduced into the cylinder and distributed uniformly on the plastic composition to be pressed there into by the action of centrifugal force and mechanically by means of a roller. The reinforcing material may alternatively comprise short glass fibre strands, which are strewn over the plastic composition, by means of a specific apparatus according to the invention, or a web of non-woven glass fibre strands or a web of braided roving.

In order to reinforce the plastic cylinder further it is known to impregnate a multi-filament glass fibre reinforcing string or tow with a plastic material and then to wind the reinforcing string in several turns around the plastic cylinder to produce a reinforcing ring, the reinforcing string being impregnated by being conducted through a bath of plastic material in a vessel having a bottom and side walls, whereafter it is wound on the cylinder.

By reinforcing plastic cylinders with a number of rings, arranged in spaced relationship along the cylinder, it is possible to reduce the wall thickness of the cylinders in manufacture. One known method of producing the rings is to pass a reinforcing string tow comprised of a plurality of fibres glass filaments down into a vessel containing liquid plastic, around a direction changing roller arranged in the bath and up to a doctor device, from where the string is then passed to the rotating cylinder, on which it is wound in consecutive turns to form a reinforcing ring. As the reinforcing string is wound on the cylinder, the tension in the string, which is caused mainly by the resistance encountered at the direction changing roller in the bath, counteracts the growth of the radial thickness of the formed reinforcing ring. The reinforcing string is drawn about the cylinder to an extent whereby the coils strive to lie adjacent each other instead of in a superimposed relationship. This means that the reinforcing ring must be made relatively wide, in order that the desired radial thickness of the ring be obtained. Such a winding process requires the application of an unnecessary number of turns, which consumes extra time and results in unnecessary material consumption. One manner in which these disadvantages can be reduced is to mount two support rings, made of plastic, for example, for each reinforcing ring, with an interspacing which corresponds to the axial thickness of the reinforcing ring and a radial height which corresponds to the radial thickness of said ring. The support rings thereby define a channel which can be filled with a number of turns of plastic impregnated reinforcing string. The disadvantage associated with this method, however, is that the two support rings give rise to a considerable increase in costs, caused by the actual cost of the support rings and the cost of mounting the same.

Another object of the present invention is therefore to avoid the aforementioned disadvantages, which is achieved by means of the method according to the present invention, which is further characterized in that the reinforcing string or tow is drawn up through a hole in one of the walls of the vessel, the size of the hole corresponding approximately to the thickness of the string, so that relatively small tension is maintained in the string as it passes through the vessel. The method is conveniently carried out in an apparatus which is characterized by an elongated vessel positioned along the cylinder and presenting a number of holes through which the string is intended to pass, the holes being located at those positions at which the reinforcing rings are to be formed. Thus, the reinforcing string may be unwound from a supply reel in practically a relaxed condition and passed through the bath, to the cylinder without any appreciable increase in the tension of the string. Because the tension in the reinforcing string is minimal, the turns will fall one on top of the other to rapidly form a ring whose radial height is greater than its axial width, if so desired. The reinforcing ring thereby obtains a high strength value with the aid of a relatively small number of turns in relation to the method described in the aforegoing. Furthermore, the necessity of support rings is obviated.

The method and apparatus according to the present invention will now be described in more detail with reference to the accompanying drawings, which diagrammatically illustrate suitable devices for carrying out the method according to the invention.

FIG. 1 is a diagrammatic view in perspective of the rotatable moulding cylinder and of a roller in position to receive a web of woven glass fibres from a supply reel.

FIG. 2 is a diagrammatic end view of the moulding cylinder subsequent to insertion of the glass fibre web into the cavity thereof, the figure also shows the web supported by a pivotable holder.

FIG. 3 is an end view of the moulding cylinder under rotation, with the roller moved against the plastic layer on the inside of the cylinder, for the purpose of unrolling the web.

The moulding cylinder 10 used is divided into two halves, held together by fastening means (not shown). The cylinder is mounted on rotatable wheels 11 and rotated by an electric motor (not shown).

Arranged in the vicinity of the cylinder is a pivotable holder 12 which carries a rotatably mounted roller 13. In the position shown with full lines, the roller lies beneath a supply reel 14 for the unrollable reinforcing material, which in the exemplary embodiment comprises a glass fibre web 15 consisting of braided roving.

The web is unrolled from the supply reel and wound up on the roller, and cut to length which is normally slightly greater than the inner circumference of the cylinder 10.

The roller 13 together with the web of reinforcing material is then swung over to a position (the position shown in chain lines) coaxial with the shaft 16 which in FIGS. 1 and 2 lies in the middle of the cylinder and is carried by a pivotable holder 17, 17a, one leg 17a of which is shown collapsed in FIG. 1. The roller 13 is moved in on the shaft 16, whereafter the loose leg 17a is swung up and connected to the outwardly protruding end of the shaft, as shown in FIG. 2. The roller can now be swung from the shown center position into abutment with the interior surface of the cylinder. Before swinging the roller into this latter position, however, a layer of plastic is applied to the inside of the cylinder.

Suspended at the botom of the cylinder is a tiltable trough 18, filled with a fluid plastic composition, suitably polyester. As the cylinder 10 rotates, the trough 18 is tilted, causing the plastic composition to run down onto the bottom of the rotating cylinder. The plastic is thus dispersed uniformly over the whole of the inside of the cylinder under the influence of centrifugal force, to form a uniform layer 19. Positioned at the edges of the cylinder are removable edge flanges 20, which prevent the plastic composition from running out of the ends of the cylinder. Only a portion of flange 20 is shown (FIG. 2).

The roller 13 together with the web reinforcing material is now swung into contact with the layer of plastic on the inside of the cylinder, as shown in FIG. 3. The end 15a of the web fastens in the plastic layer 19 and the roller 13 rolls against the layer to deposit the web 15 thereon.

Thus, the web of reinforcing material has been moved in a simple and rapid manner into the interior of the plastic cylinder, and sinks into the plastic layer under the action of the roller 13 and centrifugal force.

One or more additional layers of glass fibre reinforcing material can be mounted in the interior of the plastic cylinder in the manner described.

The plastic is then hardened until the cylinder is ready to be removed from the moulding cylinder.

What I claim is:

1. A method of manufacturing a glass-fibre reinforced plastic cylinder which comprises applying a layer of a fluent plastic composition over the inside surface of a rotating cylindrical mould, evenly dispersing the plastic over the interior surface by the action of centrifugal force; applying a web of glass fibre strands into contact with the plastic layer; pressing the strands into the plastic layer by centrifugal force and by means of a roller pressing against said strands and hardening the plastic composition.

2. A method according to claim 1, characterized in that said web is wound up onto a rotatable roller, which is moved into the cylinder, whereafter the web is brought into abutment with the plastic layer and unrolled thereon.

References Cited
UNITED STATES PATENTS

| | | | |
|---|---|---|---|
| 3,150,219 | 9/1964 | Schmidt | 264—258 |
| 2,859,151 | 11/1958 | Usab et al. | 156—74 |
| 3,251,720 | 5/1966 | Goffin et al. | 156—74 |
| 3,340,115 | 9/1967 | Rubenstein | 156—294 |
| 3,012,922 | 12/1961 | Wiltshire | 156—74 |
| 3,457,963 | 7/1969 | Harwick | 138—172 |
| 3,008,860 | 11/1961 | Balkin et al. | 156—171 |
| 2,766,099 | 10/1956 | Taylor | 156—296 |
| 3,475,532 | 10/1969 | Guldenfels et al. | 264—310 |
| 2,915,425 | 12/1959 | Biederbach et al. | 156—74 |
| 3,232,812 | 2/1966 | Lorentz et al. | 156—293 |

U.S. Cl. X.R.

156—184, 293; 264—270, 311, 312